United States Patent
Carobbio

(10) Patent No.: US 9,248,977 B2
(45) Date of Patent: Feb. 2, 2016

(54) PNEUMATIC PARTS FEEDER

(71) Applicant: TGG Automation Limited, Sheung Wan, Hong Kong (CN)

(72) Inventor: Angelo Carobbio, Hong Kong (CN)

(73) Assignee: TGG Automation Limited, Hong Kong (CN)

( * ) Notice: Subject to any disclaimer, the term of this patent is extended or adjusted under 35 U.S.C. 154(b) by 0 days.

(21) Appl. No.: 14/377,894

(22) PCT Filed: Feb. 26, 2013

(86) PCT No.: PCT/IB2013/000286
§ 371 (c)(1),
(2) Date: Aug. 11, 2014

(87) PCT Pub. No.: WO2013/128260
PCT Pub. Date: Sep. 6, 2013

(65) Prior Publication Data
US 2015/0041487 A1 Feb. 12, 2015

(30) Foreign Application Priority Data
Feb. 28, 2012 (HK) .......................... HK12101998.6

(51) Int. Cl.
*B65G 53/10* (2006.01)
*B65G 47/14* (2006.01)

(52) U.S. Cl.
CPC .................................. *B65G 47/1407* (2013.01)

(58) Field of Classification Search
USPC .................... 221/174; 406/92, 137, 142, 143; 222/195, 400.5
See application file for complete search history.

(56) References Cited

U.S. PATENT DOCUMENTS

| | | | | |
|---|---|---|---|---|
| 1,339,977 A * | 5/1920 | Pruden | ......................... | 406/133 |
| 2,707,132 A * | 4/1955 | Baresch | ......................... | 406/14 |
| 3,212,668 A * | 10/1965 | Gleason et al. | ............... | 221/156 |
| 3,226,165 A * | 12/1965 | Oehlrich et al. | ............... | 406/92 |
| 4,502,819 A * | 3/1985 | Fujii et al. | ....................... | 406/14 |
| 6,390,736 B2 * | 5/2002 | Rassman et al. | ............. | 406/180 |
| 6,454,496 B1 * | 9/2002 | Mills et al. | ..................... | 406/41 |
| 6,484,902 B1 * | 11/2002 | Rouse | .......................... | 221/278 |
| 6,632,049 B2 * | 10/2003 | Issler | ............................. | 406/86 |
| 6,662,953 B1 * | 12/2003 | Rouse | .......................... | 209/682 |
| 6,663,325 B1 * | 12/2003 | Kai et al. | ........................ | 406/46 |
| 6,971,786 B2 * | 12/2005 | Krambrock | ............... | 366/165.1 |
| 2007/0102441 A1 | 5/2007 | Fujii et al. | | |

FOREIGN PATENT DOCUMENTS

AT 392390 B 9/1990
DE 44 42 337 A1 6/1996

OTHER PUBLICATIONS

European Patent Office; International Search Report in International Patent Application No. PCT/IB2013/000286 dated Jul. 25, 2013.

* cited by examiner

*Primary Examiner* — Joseph Dillon, Jr.
(74) *Attorney, Agent, or Firm* — Leydig Voit and Mayer

(57) ABSTRACT

A parts feeder has a vortex chamber with a wall disposed generally symmetrically about an axis and into which bulk parts are fed. A vortex generator disposed at a narrow end of the chamber generates a spiral vortex that rises up the wall. Parts entrained in the vortex are separated and oriented by the vortex. Properly oriented parts are successively able to pass through an outlet port to exit the vortex chamber; thus continuously feeding parts. An opening extends through the vortex generator. Defective parts, oversize parts, and parts which are tangled or held together may readily be removed from the vortex chamber through the opening.

19 Claims, 5 Drawing Sheets

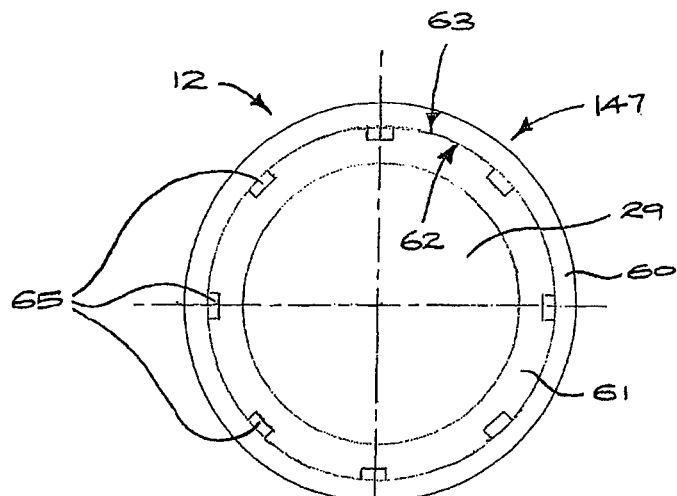
F I G. 11
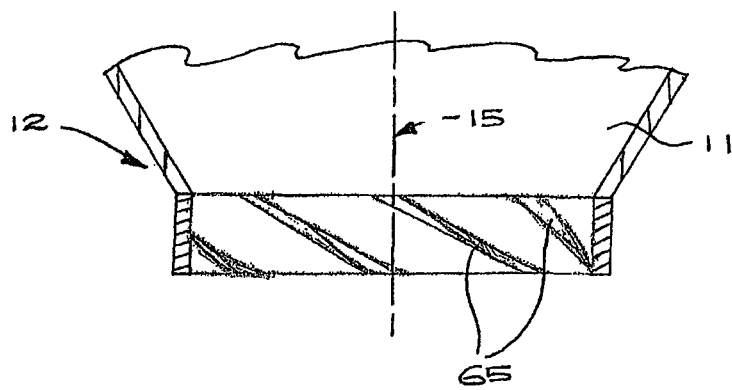
F I G. 12
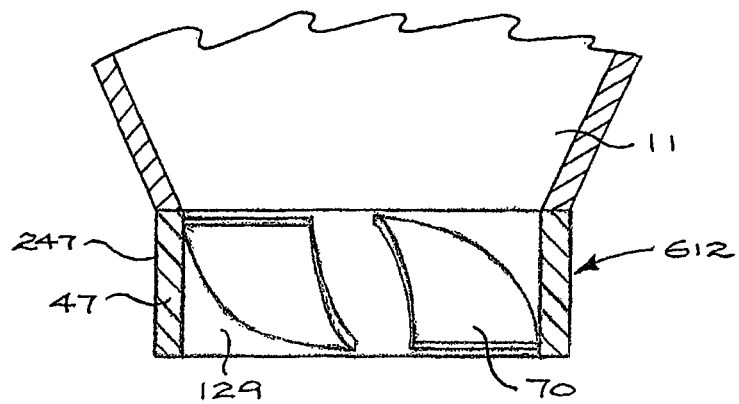
F I G. 13

PNEUMATIC PARTS FEEDER

TECHNICAL FIELD

The present invention relates to pneumatic parts feeders for separating, orienting and continuously feeding parts, and particularly to parts feeders in which a circulating air flow or vortex is generated.

BACKGROUND OF THE INVENTION

Devices are known which take parts such as springs or O-rings, and the like, and separate or untangle and orient the parts in a predetermined manner, facilitating use of the parts in subsequent manufacturing operations.

The patent publication DE102008054106 describes a pneumatic parts feeder comprising a cylinder in which a vortex is induced by tangentially aligned air inlets near the lower end of the cylinder and a helical rib provided on the cylindrical wall. The vortex entrains the parts, which are thereby singularised and rise up the helical rib toward an outlet near the top of the cylinder.

The publication DE4442337 describes a pneumatic parts feeder comprising a conical bowl in which a vortex is induced by a tangentially directed air jet provided at the top of the bowl. An aperture is provided at the narrowest, lowermost section of the bowl through which parts to be fed are injected by a piston. The vortex entrains the parts, which are thereby singularised and rise up the wall of the bowl toward a tangentially aligned discharge outlet near the top of the bowl. Only the parts having a specified orientation are able to pass through the discharge outlet.

These machines have a simple, low-cost construction providing cost effectiveness and reliability, however there is a need for improvements in this technology which retain its advantages while addressing some of the operational drawbacks that have been identified. These operational drawbacks include the relatively high air flow rate required to entrain the products, and the flexibility of operation, particularly the ability to readily reconfigure the machine to feed different parts. In addition, it has been found that oversize parts, or parts which are defective (e.g. broken or deformed) or bound together (e.g. tangled), degrade machine performance and are difficult to remove. It is an object of the present invention to overcome or substantially ameliorate the above disadvantages or, more generally, to provide an improved pneumatic parts feeder.

DISCLOSURE OF THE INVENTION

According to one aspect of the present invention there is provided a parts feeder comprising:

a vortex chamber having a wall disposed generally symmetrically about an axis;

an outlet port in the vortex chamber through which parts are fed to an outlet channel exiting the vortex chamber;

a vortex generator disposed at one end of the vortex chamber for generating a vortex in the vortex chamber; and at least one opening extending through the vortex generator, such that parts may pass out of the vortex chamber through the opening.

Preferably the vortex chamber tapers in an axial direction between a narrow end and a broad end, and the vortex generator is disposed proximate the narrow end.

Preferably the wall is circular in cross section and frustoconical.

Preferably the outlet channel extends tangentially to the wall. Preferably the outlet channel extends tangentially to a spiral path on the wall along which the parts are impelled by the vortex. Preferably the outlet port is disposed intermediate the narrow end and broad end.

Preferably the vortex chamber further comprises an annular wall fixed to the broad end, the annular wall defining a central aperture from which air may escape the vortex chamber. Preferably the annular wall lies in a plane substantially perpendicular to the axis.

Preferably the parts feeder further comprises an inlet for feeding parts into the vortex chamber, the inlet being disposed opposite the one end, most preferably proximate the broad end. Optionally, parts may be introduced into the vortex chamber by way of the at least one opening. Preferably the inlet is substantially axially aligned. Preferably a mouth of the inlet projects axially through the central aperture in the annular wall.

The vortex generator may comprise an axial flow fan, the fan comprising an impeller mounted to rotate about the axis, the impeller having a plurality of blades, and wherein the at least one opening comprises a plurality of openings between adjacent blades. The impeller may comprise a hub to which the blades are fixed and the at least one opening extending axially through the hub. A motor for turning the impeller may be mounted coaxially with the impeller, or else eccentrically with the impeller.

The vortex generator may comprise an axially symmetrical generator body through which the at least one opening extends, flow-directing means fixed to the generator body for producing an air flow with a tangential component, and an air supply for providing air to the flow-directing means. The generator body may be substantially cylindrical, but optionally the generator body may be tapered in the axial direction in like manner to the wall of the vortex chamber. The air supply may comprise a fan, compressor or reservoir of compressed air. The air supply may comprise an air flow amplifier.

The flow-directing means may comprise a nozzle fixed to the generator body and configured to direct a jet of air from the air supply. The nozzle may direct the jet of air in a direction with both an axial component and component substantially tangential to a surface of the generator body. The nozzle may comprise an air flow amplifier.

The flow-directing means may comprise static blades fixed within the generator body, wherein the at least one opening comprises a plurality of openings between adjacent static blades, and wherein air from the air supply passes through the plurality of openings between adjacent static blades.

The flow-directing means may comprise one or more passages formed in the generator body. The one or more passages may comprise helical passages extending between axially opposing ends of the generator body.

In another aspect the invention provides for the use of a parts feeder substantially as described above, wherein the outlet port has a profile complementary to the form of the parts. Preferably operation of the parts feeder comprises aligning the axis substantially upright and periodically stopping the vortex generator to allow parts to drop out of the vortex chamber through the at least one opening.

This invention provides a parts feeder which is effective and efficient in operational use, has an overall simple design which minimizes manufacturing costs and maximizes performance, and which addresses problems with the prior art machines. By providing a vortex generator at the lower end of the vortex chamber, with an opening extending therethrough, defective parts, oversize parts, or parts which are tangled or held together may readily be removed, and the machine is readily reconfigured to feed different parts. In addition, it has been found that the air flow rate required to entrain the products can be reduced.

BRIEF DESCRIPTION OF THE DRAWINGS

Preferred forms of the present invention will now be described by way of example with reference to the accompanying drawings, wherein:

FIG. 2b is schematic section in a transverse plane through the outlet port of the parts feeder of FIG. 2a;

FIG. 3b is schematic section in a transverse plane through the outlet port of the parts feeder of FIG. 3a;

FIG. 11 is a schematic top view of the vortex generator of the parts feeders of FIGS. 1-3;

FIG. 12 is a schematic, partially sectioned side view of the vortex generator of FIG. 11, and FIG. 13 is a schematic sectional view in longitudinal plane showing a sixth alternative vortex generator.

DESCRIPTION OF THE PREFERRED EMBODIMENTS

Figure 1:
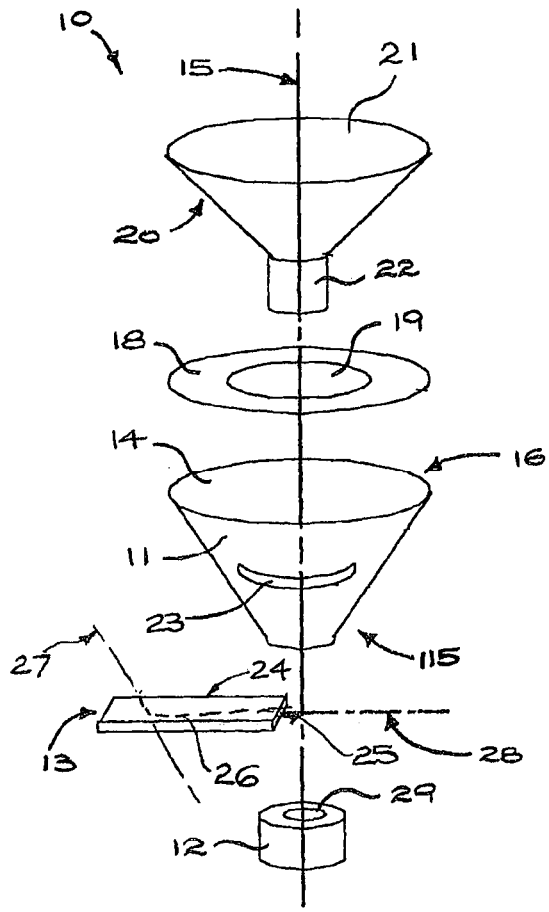
FIG. 1 is a schematic exploded isometric view of a first embodiment of the parts feeder according to the invention.
Figure 2A:
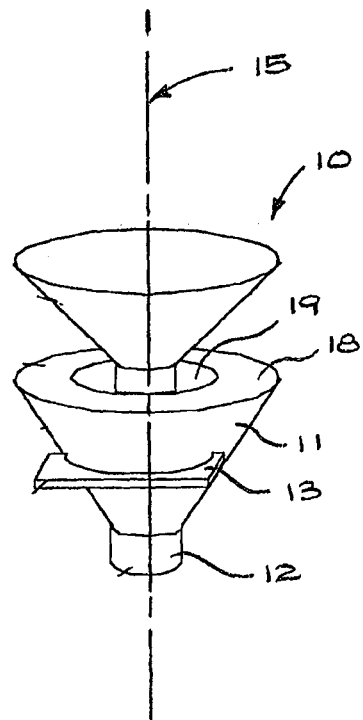
FIG. 2a is a schematic isometric view of the parts feeder of FIG. 1 assembled.
Figure 2B:
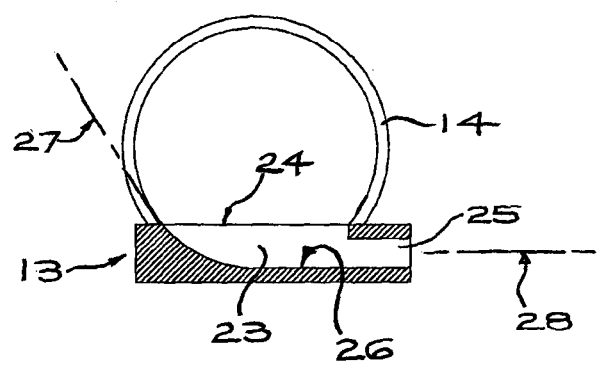

Referring to FIGS. 1, 2a and 2b, a parts feeder 10 according to a first embodiment of the invention generally includes a vortex chamber 11, a vortex generator 12 and an outlet part 13. The vortex chamber 11 has a wall 14 which is rotationally symmetric about an axis 15. As used herein, the term "axial" refers to a direction substantially parallel to the axis 4. As illustrated, the wall 14 may be frusto-conical with a circular cross section, tapering in the axial direction between a narrow end 115 and a broad end 16. Circular rims of the ends 115, 16 may lie in respective parallel planes transverse to the axis 15. A slotted outlet port 23 may be provided in the wall 14 intermediate the ends 115, 16 and sized to removeably receive the outlet part 13, which may have a bar-like form. An annular wall 18 of planar form may be fixed to the broad end 16 so as to form an inwardly projecting lip bounding a central aperture 19 from which air may escape the vortex chamber. Holes (not shown) may be provided in the wall 14 proximate the end 115, through which air may be drawn into the vortex chamber 11 by the vortex.

A funnel 20 may have a conical mouth 21 and a stem 22, which projects into the central aperture 19, and the funnel 20 may be symmetrical about axis 15. With the mouth 21 uppermost the funnel 20 provides an inlet for dropping parts into the vortex chamber 11.

The vortex generator 12 is shown schematically and is disposed at the narrow end 115 for generating a vortex that rises up through the vortex chamber 11. An opening 29 may extend between axially opposing ends of the vortex generator 12. Parts are entrained in the vortex produced by the vortex generator 12 and spiral up through the vortex chamber 11.

An outlet channel 26 (indicated by dashed lines in FIG. 1) may extend through the outlet part 13 from an axially elongated mouth in an elongate side 24 to an aperture 25 at one axial end. The outlet channel 26 in the outlet part 13 communicates with the outlet port 23 in the vortex chamber 11 and may be partially curved, having a first concave portion joining tangentially with adjacent wall 14 (a first axis 27 is shown extending through this intersection, tangentially to both the outlet part 13 and the wall 14). The outlet channel 26 may then extend linearly in the direction of a second axis 28 through the aperture 25. The outlet port 23 and partially curved outlet channel 26 have a cross section complementary to the parts to be separated, and thus define an orientation of the parts. By making the outlet part 13 removably mounted to the vortex chamber 11 the parts feeder can be readily reconfigured to suit different parts.

Figure 3A:
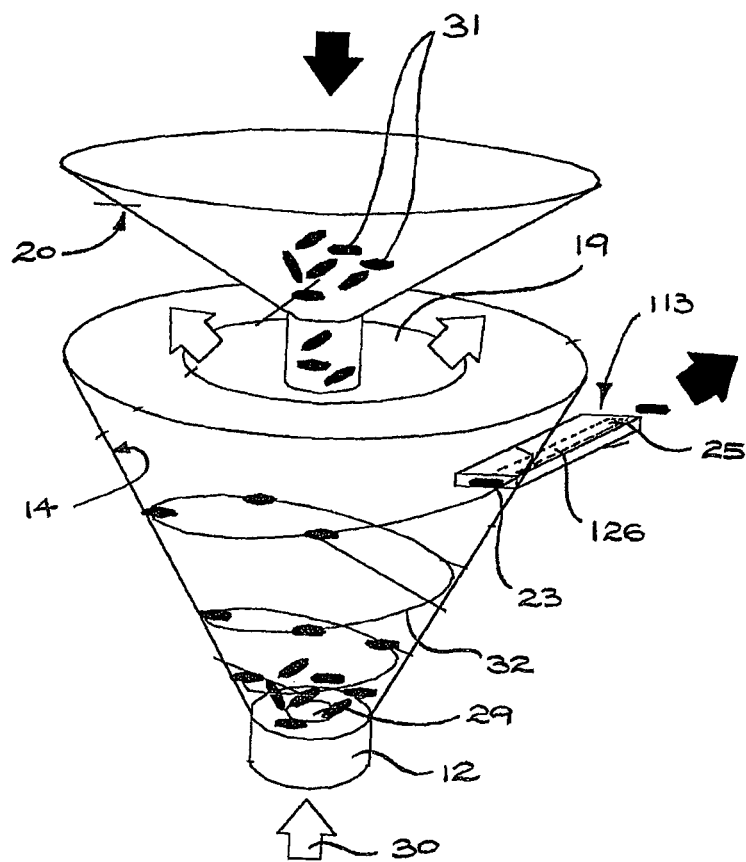
FIG. 3a is a schematic isometric view of a second embodiment of the parts feeder according to the invention.
Figure 3B:
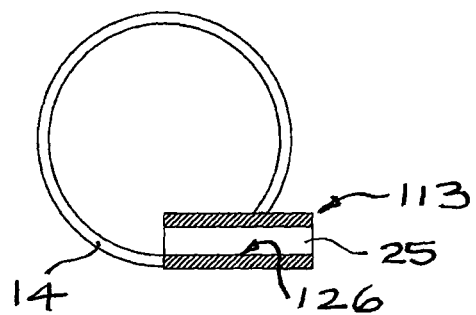

The operation of the parts feeder is described below with respect to a second embodiment shown in FIGS. 3a and 3b, which differs from the parts feeder of FIGS. 1, 2a and 2b only in respect of the outlet part 113. Rather than being curved, the outlet channel 126 (indicated by dashed lines in FIG. 3) is straight, and extends linearly between the part outlet port 23 and the aperture 25, which are at longitudinally opposing ends of the outlet part 113. Air flow from an air supply (not shown) such as a fan, compressor or reservoir of compressed air is indicated by arrow 30 and is supplied to the vortex generator 12. Bulk parts 31, such as O-rings or springs, dropped into the vortex chamber 11 through the funnel 20 fall to the narrow end 115 where they are entrained in a vortex and are thereby separated from one another and orientated. The major part of this circulating air flow exits the vortex chamber 11 through the annular section of central aperture 19 about the stem 22. The parts 31 individually follow a spiral path 32 along the wall 14, rising toward the broad end 16.

Outer surfaces of the parts may roll around the surface of the wall, and this action combined with the aerodynamic forces serve to orient the parts in a like manner. The wall is preferably smooth, but optionally, a spiral track (such as one or more grooves in the wall or raised ribs—not shown) may be formed in the wall 14 between the vortex generator 12 and part outlet port 23 to assist in guiding the parts toward the outlet port 23.

Parts 31 propelled along the spiral path 32 and in proper alignment matched with the alignment of the outlet port 23 can thus exit the vortex chamber 11 in a tangential direction to the spiral path 32 via the outlet port 23. As only one part 31 can pass through the outlet port 23 at a time the parts 31 move successively along the outlet channel 126 to exit the parts feeder 10. An air jet (not shown) may assist in transmitting the parts 31 through the outlet channel 126.

Stopping the vortex generator 12 allows faulty parts, or parts which are held together etc so as to be unable to individually exit the machine as described above, to drop through the aperture 29. Optionally, air flow through the vortex generator 12 may be reversed to extract parts through the aperture 29. The vortex generator 12 may be stopped periodically as required depending upon observations of a technician of the contents of the vortex chamber 11, such as through a transparent wall or window in the wall. Alternatively, sensors comparing the input numbers of parts (or part weight) delivered to machine, and the output numbers may trigger an alarm or automatic stopping of the vortex generator 12 to allow the vortex chamber 11 to be emptied.

FIGS. 4 to 7 illustrate alternative vortex generators 112, 212, 312, 412 which are axial flow fans with blades 35 mounted to rotate about the axis 15, wherein blade rotation imparts swirl to the air flow to generate the vortex.

Figure 4:
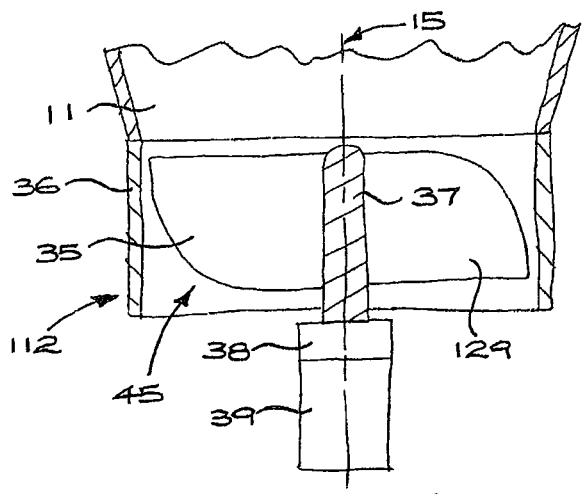
FIGS. 4 to 7 are schematic sectional views in longitudinal planes showing first through fourth alternative vortex generators respectively, for use with the parts feeder of the invention.

Referring to FIG. 4, vortex generator 112 has a cylindrical shroud 36 enclosing an impeller 45 comprising blades 35 fixed to a hub 37. The blades 35 may be rotated about the axis 15, for instance, by a coaxial motor 39 and gearbox 38. Parts-transmitting openings through the vortex generator 112 are provided by the openings 129 between adjacent blades 35, thus with blade rotation slowed sufficiently, stopped or reversed the parts 31 may drop or be drawn out of the vortex chamber 11 through the openings 129.

Figure 5:
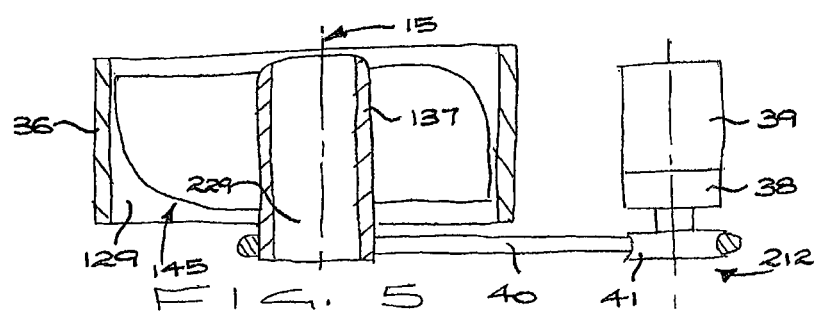

In the vortex generator 12 of FIG. 5 the impeller 145 has a hub 137 to which the blades 35 are fixed is hollow, and may be turned as by an endless belt 40 and pulley 41 driven in turn by the motor 39 and gearbox 38. In addition to the openings 129, the opening 229 extending axially through the hub 137 can pass the parts 31.

Figure 6:
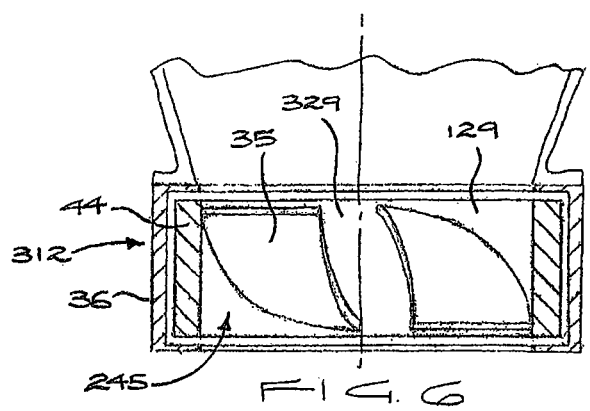

FIG. 6 shows an impeller 245 in which the blades 35 are fixed to a peripheral ring 44, with an opening 329 provided between the inner edges of the blades through which the parts 31 can pass.

Figure 7:
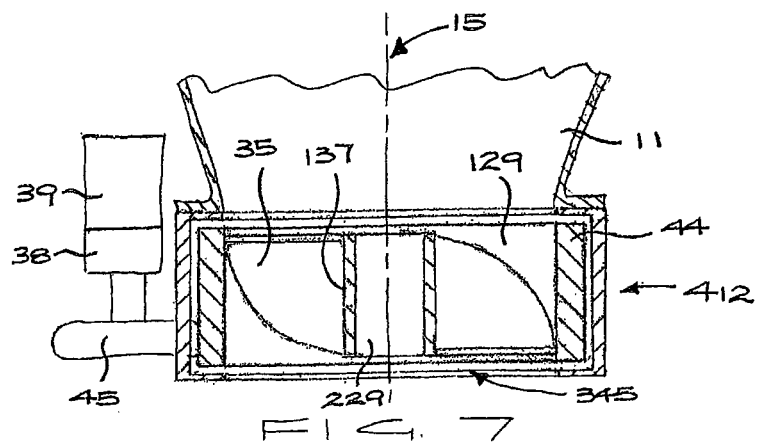

An impeller 345 is shown FIG. 7 in which the blades 35 are fixed between a peripheral ring 44 and a hollow hub 137, with the opening 229 provided through the hub 137 for the passage of parts, in addition to the openings 129 provided between the blades 35. The impeller may be turned as by wheel 45 engaged with the ring 44, and rotated in turn by the motor 39 via the gearbox 38.

Figure 8:
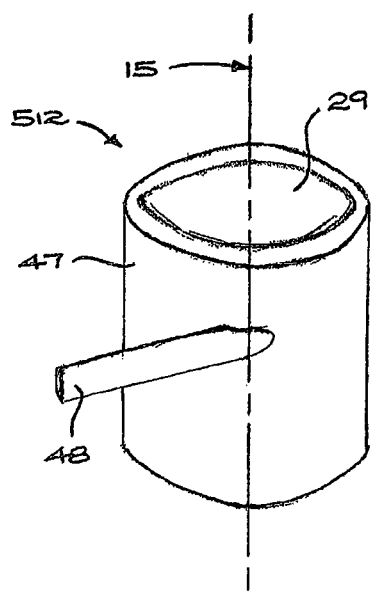
FIG. 8 is a schematic isometric view of a fifth alternative vortex generator.
Figure 9:
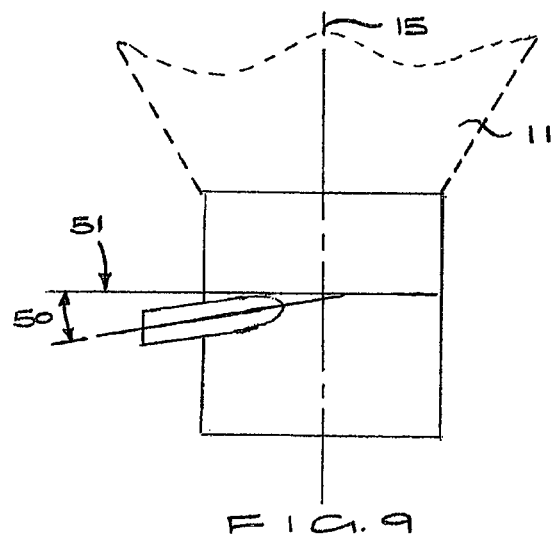
FIGS. 9 and 10 are side and top views of the vortex generator of FIG. 8.
Figure 10:
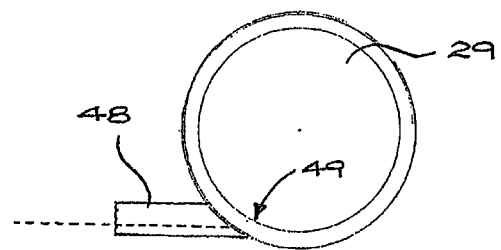

FIGS. 8 to 10 illustrate an alternative vortex generator 512 which includes a cylindrical, tubular body 47 concentric with axis 15 and through which the opening 29 extends. An elongate nozzle 48 may have a circular cross section and may extend through the tubular body 47 and end flush with the internal wall 49. As best seen in FIG. 10, an air jet introduced through the nozzle 48 from an air supply has a component tangential to the wall 49 for inducing a spiral, swirling flow. As best seen in FIG. 9 the nozzle 48 may be inclined at a helix angle 50 to a transverse plane 51 to impart an axial component to the rotating air flow generated in the body 47.

FIGS. 11 and 12 illustrate the vortex generator 12 of FIGS. 1, 2a, 2b, 3a and 3b, generally having the form of a tubular body 147 concentric with axis 15. The body 147 comprises concentric tubular inner and outer members 60, 61 with outer and inner walls 62, 63 engaged with one another. Disposed between the outer and inner walls 62, 63 are passages 65 which may be helical and formed in one of the walls 62, 63. The passages 65 may extend between axially opposing ends of the vortex generator 12 and have like dimensions, and be substantially equally circumferentially spaced. Air from a supply may be simultaneously directed into all of the passages 65, as from an annular conduit (not shown) connected to the lower end 115. In this manner each passage 65 generates an air stream in the vortex chamber 11 having both tangential and axial components.

Yet another alternative vortex generator 612 is shown in FIG. 13, in which static blades 70 are fixed within a tubular body 247. In this embodiment air from the air supply passes through the openings 129 between adjacent static blades 70, and the same openings 129 serve to pass the parts when the vortex generator 12 is not operating.

Aspects of the present invention have been described by way of example only and it should be appreciated that modifications and additions may be made thereto without departing from the scope thereof.

The invention claimed is:
1. A parts feeder comprising:
 a vortex chamber having a wall disposed generally symmetrically about an axis;
 an outlet port in the vortex chamber through which parts are fed to an outlet channel exiting the vortex chamber, wherein at least part of the outlet channel extends tangentially to the wall;
 a vortex generator disposed at an end of the vortex chamber for generating a vortex in the vortex chamber, wherein
  the vortex chamber tapers in an axial direction between a narrow end and a broad end, and
  the vortex generator is disposed proximate the narrow end; and
 at least one opening extending through the vortex generator, such that parts may pass out of the vortex chamber through the opening.

2. The parts feeder of claim 1, wherein the vortex chamber is circular in cross section and frusto-conical.

3. The parts feeder of claim 1, wherein at least part of the outlet channel extends tangentially to a spiral path on the wall along which the parts are impelled by the vortex.

4. The parts feeder of claim 1, wherein
 the vortex chamber further comprises an annular wall fixed to the broad end, and
 the annular wall defines a central aperture from which air may escape the vortex chamber.

5. The parts feeder of claim 4, wherein the annular wall lies in a plane substantially perpendicular to the axis.

6. The parts feeder of claim 1, wherein the outlet port is disposed intermediate the narrow end and the broad end.

7. The parts feeder of claim 4 further comprising an inlet for feeding parts into the vortex chamber.

8. The parts feeder of claim 7, wherein the inlet is substantially aligned with the axis.

9. The parts feeder of claim 7, wherein the inlet includes a mouth that projects axially through the central aperture in the annular wall.

10. The parts feeder of claim 1, wherein
 the vortex generator comprises an axial flow fan,
 the axial flow fan comprises an impeller mounted to rotate about the axis,
 the impeller has a plurality of blades, and
 the at least one opening comprises a plurality of openings between adjacent blades of the impeller.

11. The parts feeder of claim 10, wherein
 the impeller comprises a hub to which the blades are fixed, and
 the at least one opening extends axially through the hub.

12. The parts feeder of claim 1, wherein the vortex generator comprises
 an axially symmetrical generator body through which the at least one opening extends,
 flow-directing means fixed to the generator body for producing an air flow with a tangential component, and
 an air supply for providing air to the flow-directing means.

13. The parts feeder of claim 12, wherein the flow-directing means comprises a nozzle fixed to the generator body for directing a jet of air from the air supply.

14. The parts feeder of claim 13, wherein the nozzle directs the jet of air in a direction with both an axial component and a component substantially tangential to a surface of the generator body.

15. The parts feeder of claim 12, wherein
 the flow-directing means comprises static blades fixed within the generator body,
 the at least one opening comprises a plurality of openings located between adjacent static blades, and
 air from the air supply passes through the plurality of openings between adjacent static blades.

16. The parts feeder of claim 12, wherein the flow-directing means comprises at least one passage located in the generator body.

17. The parts feeder of claim 16, wherein the at least one passage comprises helical passages extending between axially opposing ends of the generator body.

18. A parts feeder comprising:
a vortex chamber having a wall disposed generally symmetrically about an axis, wherein the vortex chamber is circular in cross section and frusto-conical;
an outlet port in the vortex chamber through which parts are fed to an outlet channel exiting the vortex chamber, wherein at least part of the outlet channel extends tangentially to the wall;
a vortex generator disposed proximate a first end of the vortex chamber for generating a vortex in the vortex chamber, wherein
the vortex chamber has a second end and tapers in an axial direction between the first end and the second end, and
the first end is narrower than the second end; and
at least one opening extending through the vortex generator, such that parts may pass out of the vortex chamber through the opening.

19. The parts feeder of claim 18, wherein at least part of the outlet channel extends tangentially to a spiral path on the wall along which the parts are impelled by the vortex.

* * * * *